(12) United States Patent
Suzuki

(10) Patent No.: US 8,452,114 B2
(45) Date of Patent: May 28, 2013

(54) DECODING APPARATUS AND CONTROL METHOD THEREOF

(75) Inventor: Masaki Suzuki, Cambridge, MA (US)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 12/475,929

(22) Filed: Jun. 1, 2009

(65) Prior Publication Data

US 2009/0310878 A1 Dec. 17, 2009

(30) Foreign Application Priority Data

Jun. 11, 2008 (JP) ................... 2008-153395

(51) Int. Cl.
*G06K 9/00* (2006.01)
*G06K 9/46* (2006.01)

(52) U.S. Cl.
USPC .......................................... 382/251; 382/248

(58) Field of Classification Search
USPC .................. 382/112, 232, 233, 248, 251, 254
See application file for complete search history.

(56) References Cited

U.S. PATENT DOCUMENTS

| | | | | |
|---|---|---|---|---|
| 5,838,378 A | * | 11/1998 | Nakagawa et al. | 375/240.12 |
| 6,463,182 B1 | * | 10/2002 | Onishi et al. | 382/261 |
| 7,373,003 B2 | * | 5/2008 | Mitchell et al. | 382/235 |
| 2004/0071352 A1 | * | 4/2004 | Mizoguchi et al. | 382/233 |
| 2006/0188024 A1 | * | 8/2006 | Suzuki et al. | 375/240.23 |
| 2006/0215917 A1 | * | 9/2006 | Kimura | 382/233 |
| 2006/0215918 A1 | * | 9/2006 | Kimura | 382/233 |
| 2007/0160299 A1 | * | 7/2007 | Kajiwara et al. | 382/240 |
| 2008/0219571 A1 | * | 9/2008 | Suzuki et al. | 382/236 |

FOREIGN PATENT DOCUMENTS

JP 9-186993 A 7/1997

\* cited by examiner

*Primary Examiner* — John Strege
(74) *Attorney, Agent, or Firm* — Fitzpatrick, Cella, Harper & Scinto

(57) ABSTRACT

A decoding apparatus for decoding an encoded image signal and its control method. The decoding apparatus decodes the encoded image signal and inverse-quantizes decoded information. The apparatus inverse-orthogonal transform an inverse-quantized information to obtain a decoded image signal. A quantization error estimator estimates a maximum square error of the inverse-quantized information and a second inverse-orthogonal transformer inverse-orthogonal transforms the quantization error from the quantization error estimator. An image-quality enhancing signal generator generates an image-quality enhancing signal based on the quantization maximum error and the decoded image signal, and an image synthesizer generates a high-quality image signal by synthesizing the image-quality enhancing signal with the decoded image signal.

14 Claims, 11 Drawing Sheets

DECODING APPARATUS AND CONTROL METHOD THEREOF

BACKGROUND OF THE INVENTION

1. Field of the Invention

The present invention relates to a decoding apparatus for decoding an encoded image and its control method.

2. Description of the Related Art

Japanese Patent Laid-Open No. 09-186993 discloses a technique for reducing mosquito noise or block noise upon decoding of an encoded image. This technique eliminates noise by segmenting an image into plural areas then adaptively changing filter strength in correspondence with each segmented area.

However, conventionally, the range of filter strength is empirically determined, and it is difficult to quantitatively predict the quality of an image as a worst result of use of the filter strength. Accordingly, in many cases, to avoid image distortion due to noise reduction processing, noise reduction processing with lowered filter strength is performed.

SUMMARY OF THE INVENTION

An aspect of the present invention is to eliminate the above-mentioned problems with the conventional technology.

According to an aspect of a decoding apparatus and its control method of the present invention, it is possible to perform high-definition image-quality enhancing processing by pixel.

According to an aspect of the present invention, there is provided a decoding apparatus for decoding an encoded image signal, comprises: an entropy decoding unit that entropy-decodes an encoded image signal; an inverse-quantization unit that inverse-quantizes information decoded by the entropy decoding unit; a first inverse-orthogonal transformer that inverse-orthogonal transforms a signal obtained by the inverse-quantization unit to obtain a decoded image signal; a quantization error estimation unit that estimates an error by encoding from the signal obtained by the inverse-quantization unit; a second inverse-orthogonal transformer that inverse-orthogonal transforms information obtained by the quantization error estimation unit; an image-quality enhancing signal generation unit generates an image-quality enhancing signal to image-quality enhance a decoded image from the decoded image signal and an output from the second inverse-orthogonal transformation unit; and an image synthesizing unit that synthesizes the image-quality enhancing signal obtained by the image-quality enhancing signal generation unit with the decoded image signal.

According to another aspect of the present invention, there is provided a control method for a decoding apparatus for decoding an encoded image, comprises: an entropy decoding step of entropy-decoding an encoded image signal; an inverse-quantization step of inverse-quantizing information decoded in the entropy decoding step; a first inverse-orthogonal transformation step of inverse-orthogonal transforming a signal obtained in the inverse-quantization step to obtain a decoded image signal; a quantization error estimation step of estimating an error by encoding from a signal obtained in the inverse-quantization step; a second inverse-orthogonal transformation step of inverse-orthogonal transforming information obtained in the quantization error estimation step; an image-quality enhancing signal generation step of generating an image-quality enhancing signal to image-quality enhance a decoded image from the decoded image signal and an output outputted in the second inverse-orthogonal transformation step; and an image synthesizing step of synthesizing the image-quality enhancing signal obtained in the image-quality enhancing signal generation step with the decoded image signal.

Further features and aspects of the present invention will become apparent from the following description of exemplary embodiments with reference to the attached drawings.

BRIEF DESCRIPTION OF THE DRAWINGS

The accompanying drawings, which area incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
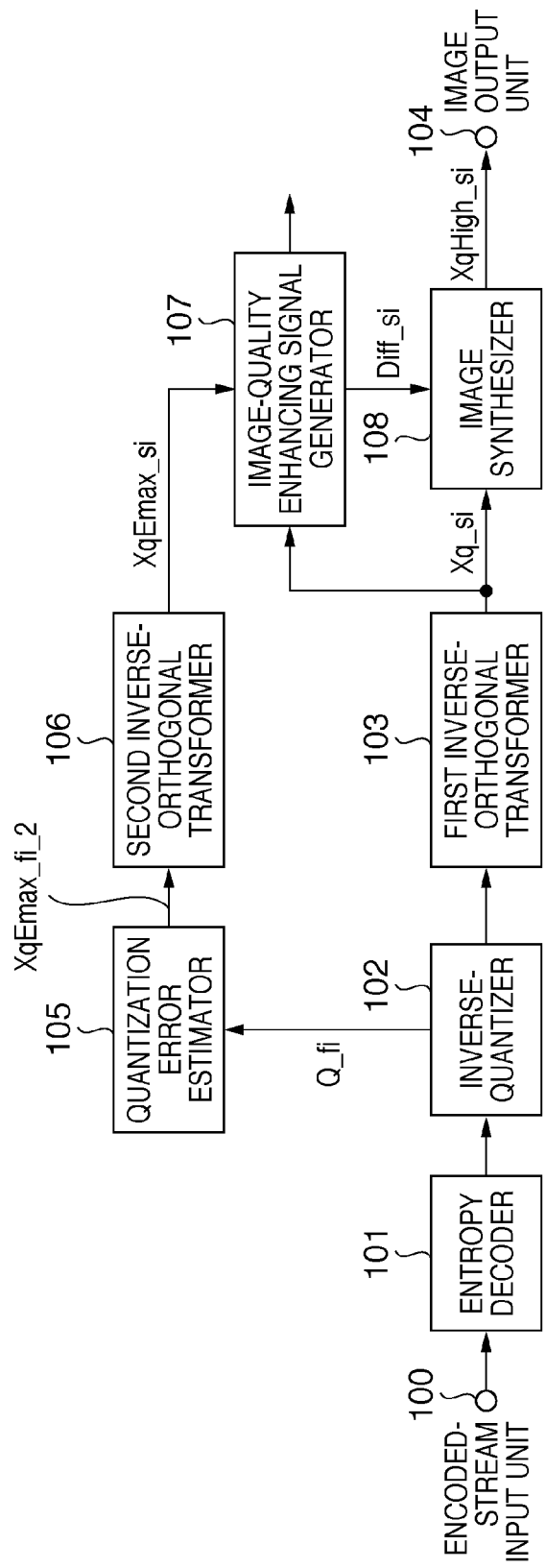
FIG. 1 is a block diagram describing a functional configuration of a decoding apparatus according to a first embodiment of the present invention.

FIG. 1 is a block diagram describing a functional configuration of a decoding apparatus according to a first embodiment of the present invention.

Note that in the present embodiment, image-quality enhancement upon decoding and reproduction of a JPEG-like compression-encoded image utilizing orthogonal transformation, quantization and entropy encoding will be described. However, encoded images encoded by any other coding method may be handled as long as the method includes processes of orthogonal transformation and quantization. For example, a moving image encoded by MPEG 2 or MPEG 4 method may be used. Otherwise, an inter-encoded image may be used.

In FIG. 1, an encoded-stream input unit 100 inputs an encoded stream of an image encoded by the above-described encoding method. An entropy decoder 101 entropy-decodes the input encoded stream to generate quantized information. An inverse-quantizer 102 performs inverse-quantization based on the quantized information. A first inverse-orthogonal transformer 103 performs inverse-orthogonal transformation on information outputted from the inverse-quantizer 102 to generate a decoded image signal. A quantization error estimator 105 estimates a maximum square error on frequency space by spectrum from quantization information (quantization matrix) obtained from the inverse-quantizer 102. A second inverse-orthogonal transformer 106 performs inverse-orthogonal transformation on information outputted from the quantization error estimator 105. An image-quality enhancing signal generator 107 generates an image-quality enhancing signal using information supplied from the second inverse-orthogonal transformer 106 and the decoded image signal supplied from the first inverse-orthogonal transformer 103. An image synthesizer 108 adds the image-quality enhancing signal from the image-quality enhancing signal generator 107 to the decoded image signal from the first inverse-orthogonal transformer 103 thereby generates a quality enhanced image signal. An image output unit 104 outputs the quality enhanced image signal outputted from the image synthesizer 108 to the outside.

Next, the details of the image-quality enhancing signal generator 107 will be described with reference to FIG. 2.

Figure 2:
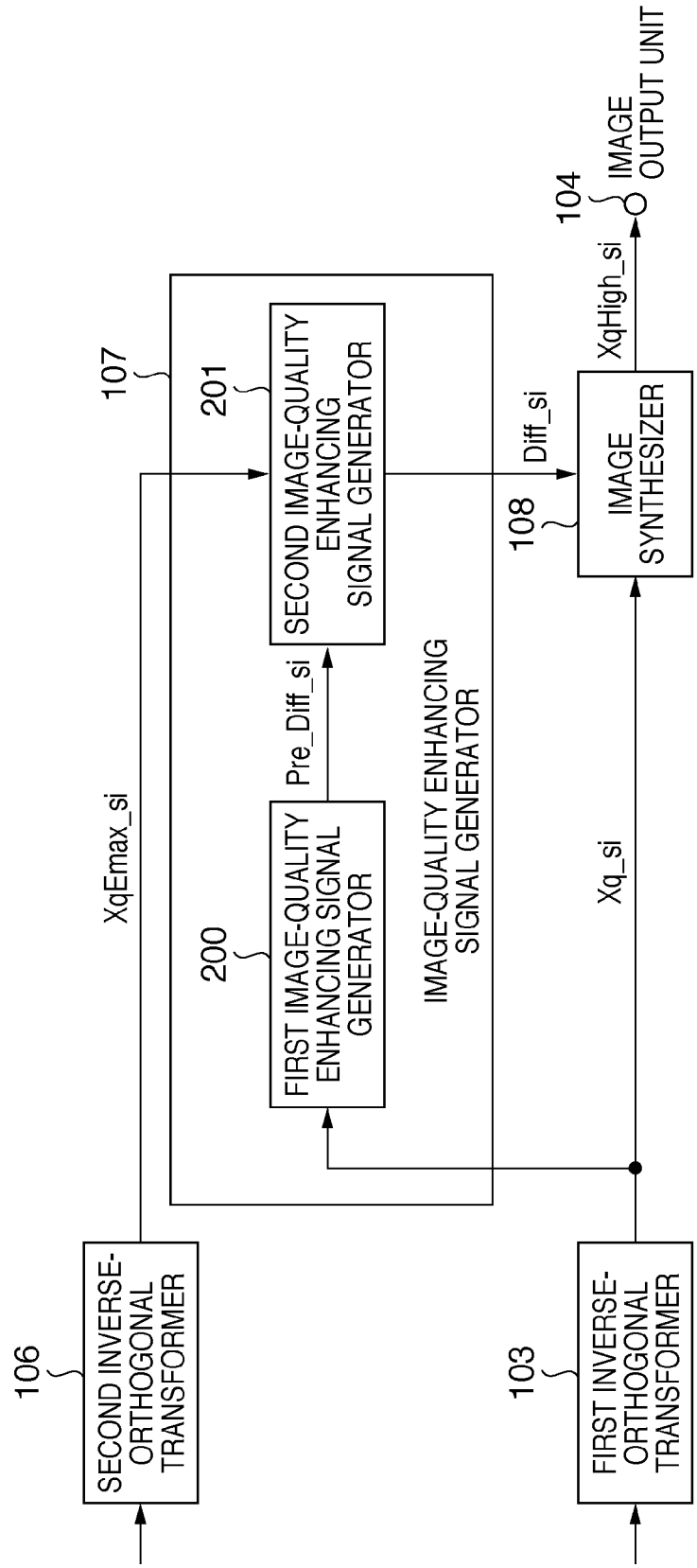
FIG. 2 is a block diagram describing a functional configuration of an image-quality enhancing signal generator according to the first embodiment.

FIG. 2 is a block diagram describing a functional configuration of the image-quality enhancing signal generator 107 according to the present embodiment. In FIG. 2, elements corresponding to those above-described elements in FIG. 1 have the same reference numerals.

A first image-quality enhancing signal generator 200 extracts an edge included in the decoded image signal outputted from the first inverse-orthogonal transformer 103. A second image-quality enhancing signal generator 201 outputs a signal obtained by threshold-based processing on a signal from the first image-quality enhancing signal generator 200 using the information from the second inverse-orthogonal transformer 106.

Next, the details of the quantization error estimator 105 will be described.

Figure 3:
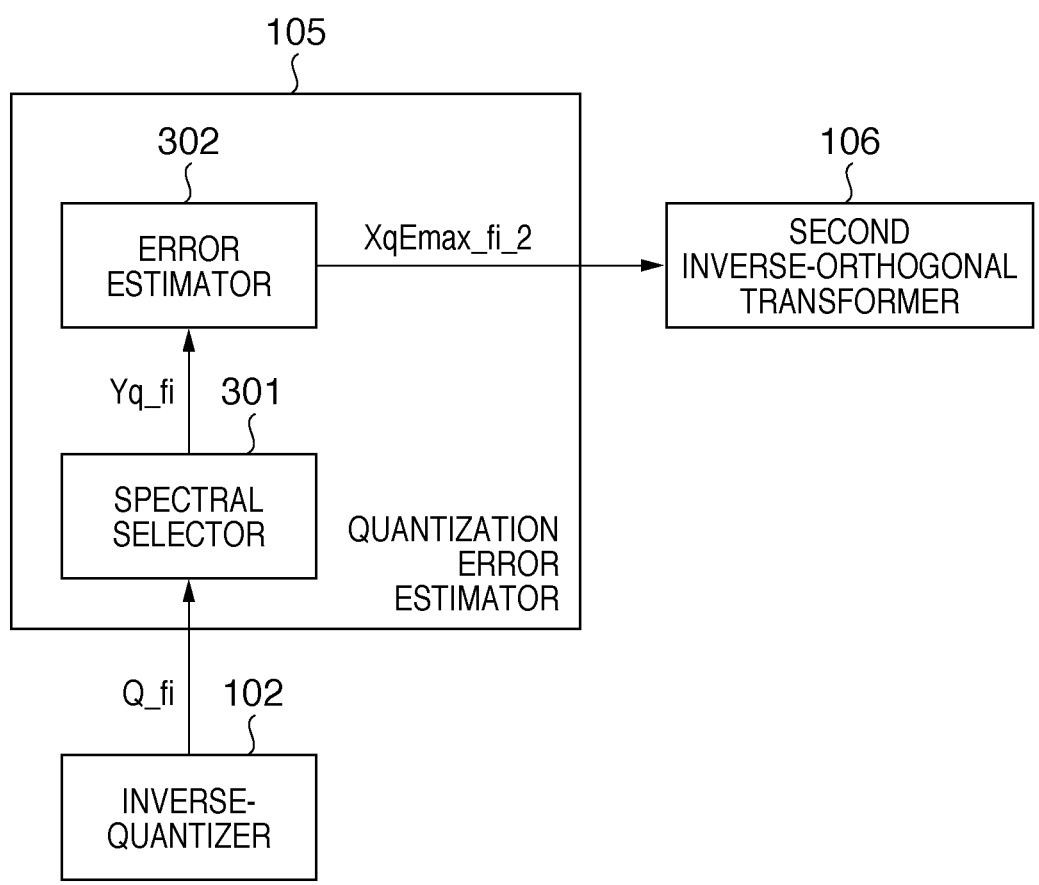
FIG. 3 is a block diagram describing a functional configuration of a quantization error estimator according to the first embodiment.

FIG. 3 is a block diagram describing a functional configuration of the quantization error estimator 105 according to the present embodiment. In FIG. 3, elements corresponding to those above-described elements in FIG. 1 have the same reference numerals.

A spectral selector 301 selects a spectrum for which a maximum square error on frequency space is to be estimated from the quantization information obtained from the inverse-quantizer 102. An error estimator 302 inputs the quantization information for the spectrum selected by the spectral selector 301, and estimates a maximum square error on the frequency space.

Next, the flow of processing by the decoding apparatus according to the present embodiment will be described with reference to the flowchart of FIG. 4.

Figure 4:
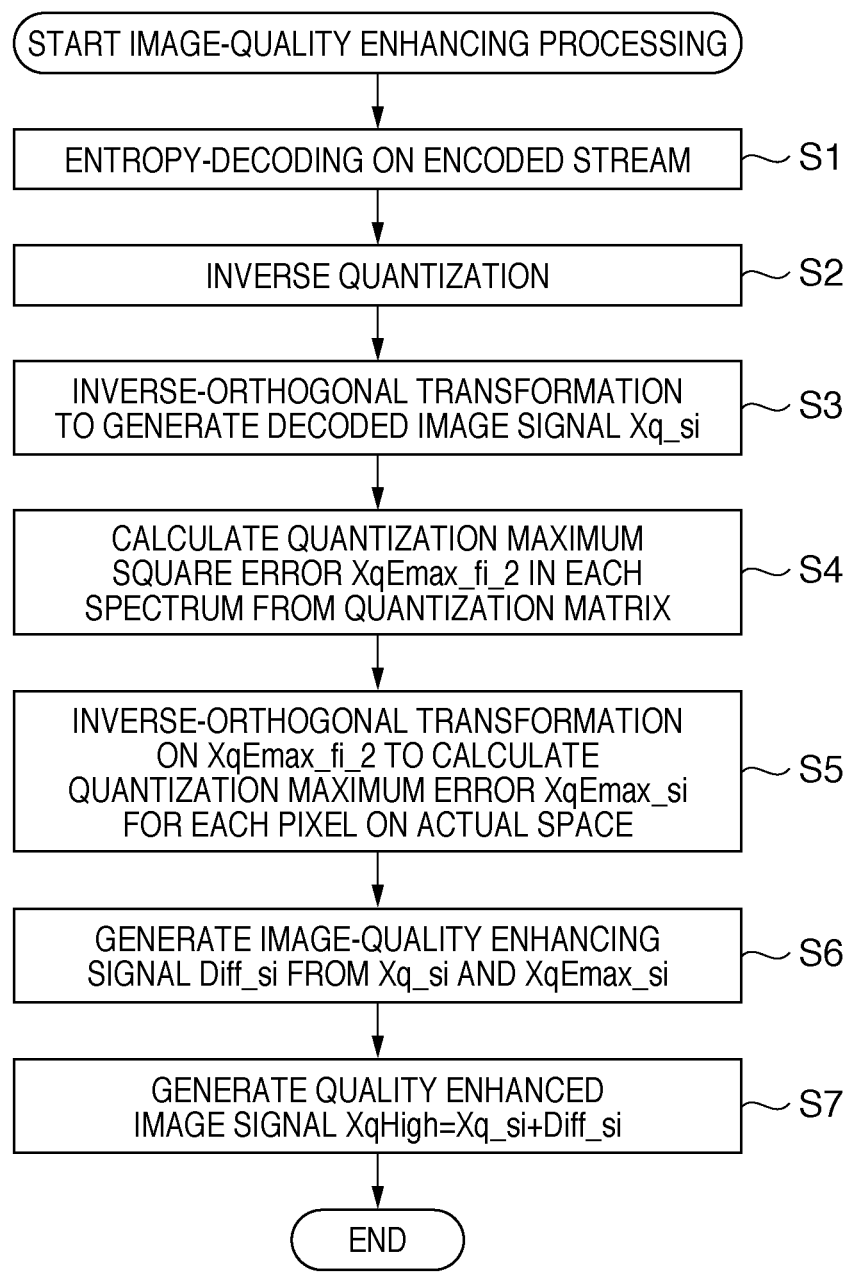
FIG. 4 is a flowchart describing decoding processing according to the first embodiment of the present invention.

FIG. 4 is a flowchart describing decoding processing by the decoding apparatus according to the first embodiment of the present invention. This processing is performed in accordance with the block diagram shown in FIG. 1.

An input image is encoded by a unit (pixel matrix) of (8×8) pixels, and pixels constituting the pixel matrix are indexed as $Si=1, \ldots, 64$. In the present embodiment, the resolution of an input image is (8×8) pixels. Further, in the present embodiment, an image having one (8×8) pixel matrix is inputted, however, an image having plural pixel matrixes may be inputted. Further, the unit of the pixel matrix is not limited to (8×8) pixels but any unit may be used. Further, in the present embodiment, image-quality enhancing processing with edge emphasis will be described, however, the present invention is not limited to the image-quality enhancing with edge emphasis. Any processing may be used as long as it is adding any signed signal to a decoded image. For example, the image-quality enhancing processing may include any one or a combination of at least two of edge emphasis process, encoding noise reduction process, motion compensation process, IP conversion, frame-rate conversion process and color conversion process.

When the image-quality enhancing process is started, first, in step S1, an encoded stream is inputted from the encoded-stream input unit 100, and the encoded stream is entropy-decoded by the entropy decoder 101. Next, in step S2, inverse-quantization is performed by the inverse-quantizer 102. Next, in step S3, the inverse-orthogonal transformation is performed by the first inverse-orthogonal transformer 103, and as a result, a decoded image signal ($Xq\_si$) is generated. Next, in step S4, the quantization error estimator 105 obtains a quantization matrix $Q\_fi$ when the spectrum has been actually divided upon quantization, that is, the quantization matrix $Q\_fi$ used in the quantization, from the inverse-quantizer 102. Then, the quantization error estimator 105 calculates a quantization maximum square error $XqEmax\_fi\_2$ in each frequency spectrum. Next, in step S5, the second inverse-orthogonal transformer 106 performs inverse-orthogonal transformation on the quantization maximum square error $XqEmax\_fi\_2$, and calculates a quantization maximum error $XqEmax\_si$ on actual space. Next, in step S6, the image-quality enhancing signal generator 107 generates an image-quality enhancing signal $Diff\_si$ from the quantization maximum error $XqEmax\_si$ on the actual space and the decoded image signal $Xq\_si$. Then in step S7, the image synthesizer 108 adds the image-quality enhancing signal $Diff\_si$ to the decoded image signal $Xq\_si$ thereby generates a quality enhanced image signal $XqHigh\_si$. Thus the image-quality enhancing processing ends. The details of the decoding processing (image-quality enhancing processing) are as described above.

Further, the details of the processing by the quantization error estimator 105 (processing in step S4 in FIG. 2) will be described with reference to the flowchart of FIG. 5.

Figure 5:
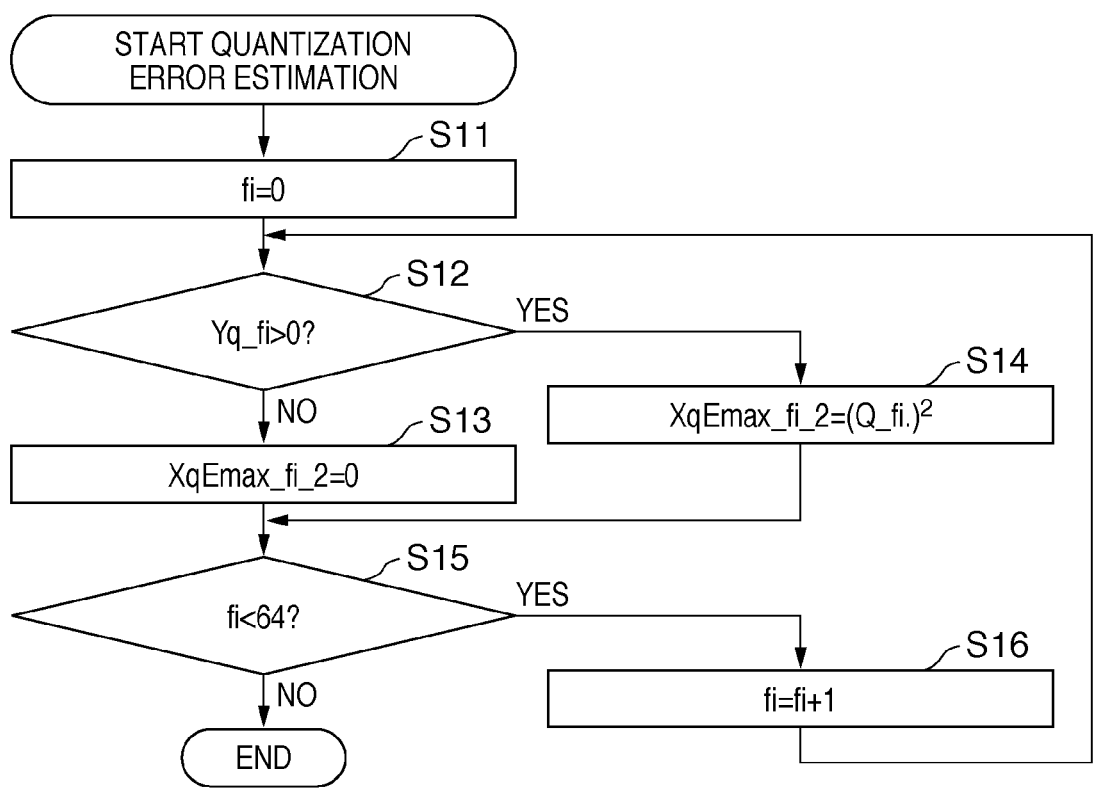
FIG. 5 is a flowchart describing processing by the quantization error estimator according to the first embodiment of the present invention.

FIG. 5 is a flowchart describing the processing by the quantization error estimator 105 according to the first embodiment of the present invention.

When the quantization error estimation processing is started, first, in step S11, a spectrum index $fi$ is initialized to "0". Next, in step S12, the value of the spectrum of interest $Yq\_fi$ is compared with the value "0". If the value of the spectrum of interest $Yq\_fi$ is greater than "0", then the process proceeds to step S14, in which the quantization maximum square error $XqEmax\_fi\_2$ is set to the square of the quantization matrix Q_fi, then the process proceeds to step S15. On the other hand, if the value of the spectrum of interest Yq_fi is less than "0", then the process proceeds to step S13, at which the quantization maximum square error XqEmax_fi__2 is set to be "0", and the process proceeds to step S15. In step S15, the index fi is compared with the number of pixels of the image as the subject of the processing, "64". If the value of the index fi is less than "64", then the process proceeds to step S16, at which the index fi is incremented (fi=fi+1), then the process returns to step S12. On the other hand, if it is determined in step S15 that the value of the index fi equals to "64", then the process ends.

The details of the processing by the quantization error estimator 105 are as above.

Next, the details of the processing at step S6 in FIG. 4 will be described with reference to the flowchart of FIG. 6.

Figure 6:
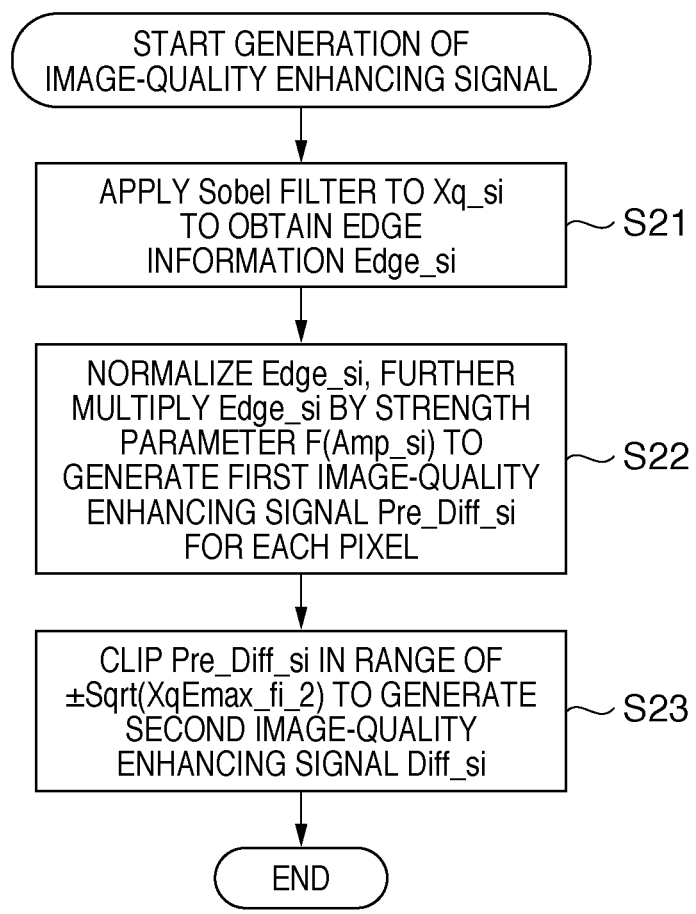
FIG. 6 is a flowchart describing processing by the image-quality enhancing signal generator according to the first embodiment of the present invention.

FIG. 6 is a flowchart showing the processing by the image-quality enhancing signal generator 107 in step S6 in FIG. 4 according to the first embodiment. This processing is performed in accordance with the block diagram shown in FIG. 2.

When the generation of the image-quality enhancing signal is started, first, in step S21, the first image-quality enhancing signal generator 200 detects an edge of the decoded image signal Xq_si with a Sobel filter and obtains edge information Edge_si. Next, in step S22, the first image-quality enhancing signal generator 200 normalizes the edge information Edge_si, then multiplies the edge information Edge_si by a strength parameter F(Amp_si) thereby generates a first image-quality enhancing signal Pre_Diff_si for each pixel. The strength parameter F(Amp_si) is a monotonically increasing function with Amp_si as a variable. Next, in step S23, the second image-quality enhancing signal generator 201 clips the value of each component of the first image-quality enhancing signal Pre_Diff_si that is within the value of each element of $\pm\sqrt{(XqEmax\_si)}$ thereby generating an image-quality enhancing signal Diff_si.

In the present embodiment, the strength parameter F(Amp_si) is a monotonically increasing function, however, it may be a multivariable function having statistical information of the decoded image signal Xq_si, information on the spectrum of interest Yq_fi or the like as a variable. Further, only the statistical information of the decoded image signal Xq_si may be used.

Further, each element of the quantization maximum square error XqEmax_fi__2 may be masked with a mask generated with statistical information of the spectrum of interest Yq_fi or the like. Further, the quantization maximum square error XqEmax_fi__2 may be changed by referring to the statistical information of the decoded image signal. In this case, a route for the flow of statistical information or the like from the first inverse-orthogonal transformer 103 to the quantization error estimator 105 is prepared.

The outline of the first embodiment is as described above. Note that in the first embodiment, clipping is performed on information from the first image-quality enhancing signal generator 200 with information from the image-quality enhancing signal generator 107. The first embodiment may be arranged such that scaling is performed on the information from the first image-quality enhancing signal generator 200 limited to a maximum value from the image-quality enhancing signal generator 107. Further, the first and second inverse-orthogonal transformers 103 and 106 may be substituted with one inverse-orthogonal transformer.

Further, the first image-quality enhancing signal generator 200 may perform any one or a combination of at least two of the encoding noise reduction processing, the motion compensation process, the IP conversion process, the frame rate transformation process and the color conversion process.

As described above, according to the first embodiment, high-definition image-quality enhancing processing can be performed by pixel. Further, as the upper limit of the strength of the image-quality enhancing processing is defined, image distortion due to image-quality enhancement can be avoided. Further, as a signal added to a decoded image signal is previously obtained, an image-quality enhancing signal can be quickly generated.

Second Embodiment

In the second embodiment, the image-quality enhancing signal generator 107 in the above-described first embodiment is substituted with a general-purpose image-quality enhancing signal generator 107a. Accordingly, the configuration of the second embodiment is the same as that of the above-described first embodiment except the general-purpose image-quality enhancing signal generator 107a, therefore the configuration of the general-purpose image-quality enhancing signal generator 107a will be described with reference to FIG. 7 and explanations of the other elements will be omitted.

Figure 7:
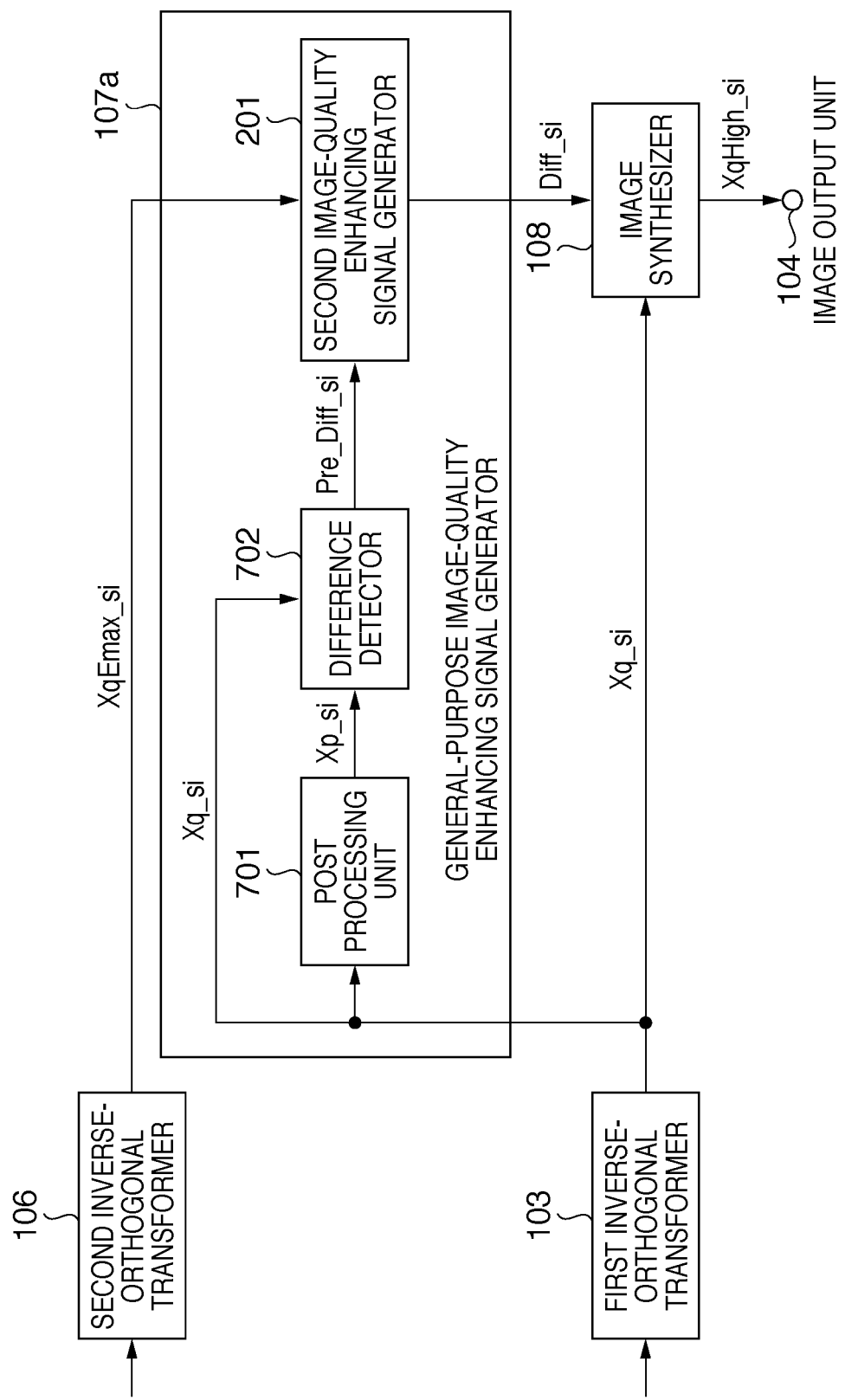
FIG. 7 is a block diagram describing a functional configuration of a general-purpose image-quality enhancing signal generator according to a second embodiment of the present invention.

FIG. 7 is a block diagram showing a functional configuration of the general-purpose image-quality enhancing signal generator 107a according to the second embodiment of the present invention.

A post processing unit 701 performs edge emphasis on a decoded image signal Xq_si generated by the first inverse-orthogonal transformer 103. A difference detector 702 detects a difference between the decoded image signal Xq_si generated by the first inverse-orthogonal transformer 103 and a first image-quality enhancing signal edge-emphasized by the post processing unit 701. The second image-quality enhancing signal generator 201 has the same function as that in the above-described first embodiment. Note that the processing by the post processing unit 701 may include any one or a combination of at least two of the encoding noise reduction process, the motion compensation process, the IP conversion process, the frame rate conversion process and the color conversion other than the edge emphasis process.

The flow of processing in the block diagram of FIG. 7 will be described with reference to the flowchart of FIG. 8.

Figure 8:
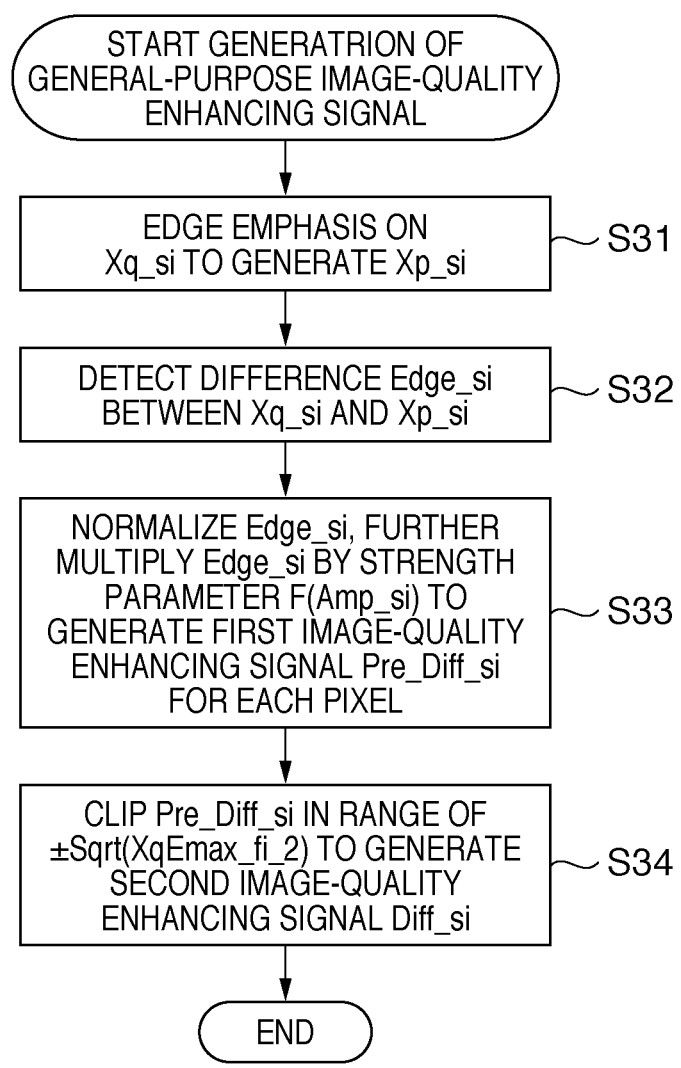
FIG. 8 is a flowchart describing processing by the general-purpose image-quality enhancing signal generator according to the second embodiment of the present invention.

FIG. 8 is a flowchart describing processing by the general-purpose image-quality enhancing signal generator 107a according to the second embodiment of the present invention.

When the generation of general-purpose image-quality enhancing signal is started, first, in step S31, edge emphasis is performed on the decoded image signal Xq_si generated by the first inverse-orthogonal transformer 103, and thereby, an edge-emphasized decoded image signal Xp_si is generated. Next, in step S32, the difference detector 702 detects a difference Edge_si between the decoded image signal Xq_si and the edge-emphasized decoded image signal Xp_si. Next, in step S33, the difference detector 702 normalizes the edge information Edge_si, then multiplies the edge information Edge_si by the strength parameter F(Amp_si), and thereby generates the first image-quality enhancing signal Pre_Diff_si for each pixel. The strength parameter F(Amp_si) is a monotonically increasing function with Amp_si as a variable. Next, in step S34, the second image-quality enhancing signal generator 201 clips the value of each component of the first image-quality enhancing signal Pre_Diff_si with each element of $\pm\sqrt{(XqEmax\_si)}$, and thereby generates the image-quality enhancing signal Diff_si. Thus the general-purpose image-quality enhancing signal generation ends.

In the second embodiment, the strength parameter F(Amp_si) is a monotonically increasing function, however, it may be a multivariable function having statistical information of the decoded image signal Xq_si, information on the spectrum of interest Yq_fi or the like as a variable. Further, only the statistical information of the decoded image signal Xq_si may be used. Further, each element of the quantization maximum square error XqEmax_fi_2 may be masked with a mask generated with statistical information of the spectrum of interest Yq_fi or the like. Further, the quantization maximum square error XqEmax_fi_2 may be changed by referring to the statistical information of the decoded image. In this case, a route for the flow of statistical information or the like from the first inverse-orthogonal transformer 103 to the quantization error estimator 105 is prepared.

The outline of the second embodiment is as described above. Note that the first and second inverse-orthogonal transformers 103 and 106 may be substituted with one inverse-orthogonal transformer.

In the second embodiment, high-definition image-quality enhancing processing can be performed in a unit of pixel. Further, as the upper limit of the strength of the image-quality enhancing processing is defined, image distortion due to image-quality enhancement can be avoided. Further, only the image-quality enhancing processing to add a signal to a decoded image signal is used, however, the present invention is applicable to other image-quality enhancing processings.

Third Embodiment

In the third embodiment, the image-quality enhancing signal generator 107 in the above-described first embodiment is substituted with an optimum image-quality enhancing signal generator 107b. Accordingly, the configuration of the third embodiment is the same as that of the above-described first embodiment except the the optimum image-quality enhancing signal generator 107b, therefore the configuration of the optimum image-quality enhancing signal generator 107b will be described with reference to FIG. 9 and explanations of the other elements will be omitted.

Figure 9:
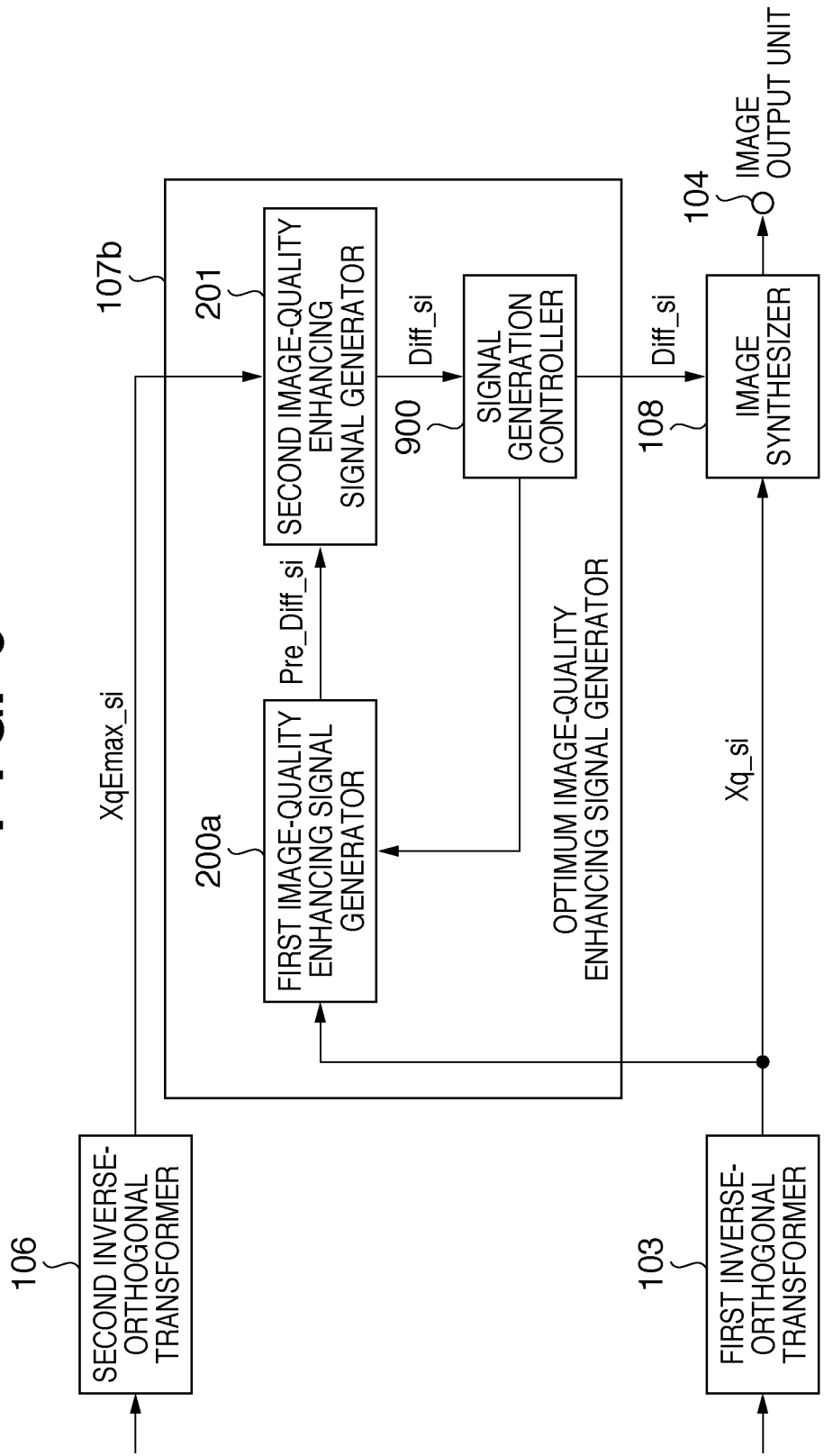
FIG. 9 is a block diagram describing a functional configuration of an optimum image-quality enhancing signal generator according to a third embodiment of the present invention.

FIG. 9 is a block diagram showing a functional configuration of the optimum image-quality enhancing signal generator 107b according to the third embodiment of the present invention.

A signal generation controller 900 compares the signal (Diff_si) from the second image-quality enhancing signal generator 201 with a prepared model and determines the similarity. If the similarity is equal to or higher than a predetermined value, then the signal generation controller 900 transmits the signal to the image synthesizer 108. On the other hand, if it is determined that the similarity is lower than the predetermined value, then the signal generation controller 900 issues a re-processing command to generate the first image-quality enhancing signal again to a first image-quality enhancing signal generator 200a. The first image-quality enhancing signal generator 200a is a signal generator where a re-generation function corresponding to the re-processing command is added to the first image-quality enhancing signal generator 200 in the above-described first embodiment. Further, the second image-quality enhancing signal generator 201 has the same function as that in the first embodiment.

The flow of processing in the block diagram of FIG. 9 will be described with reference to the flowchart of FIG. 10.

Figure 10:
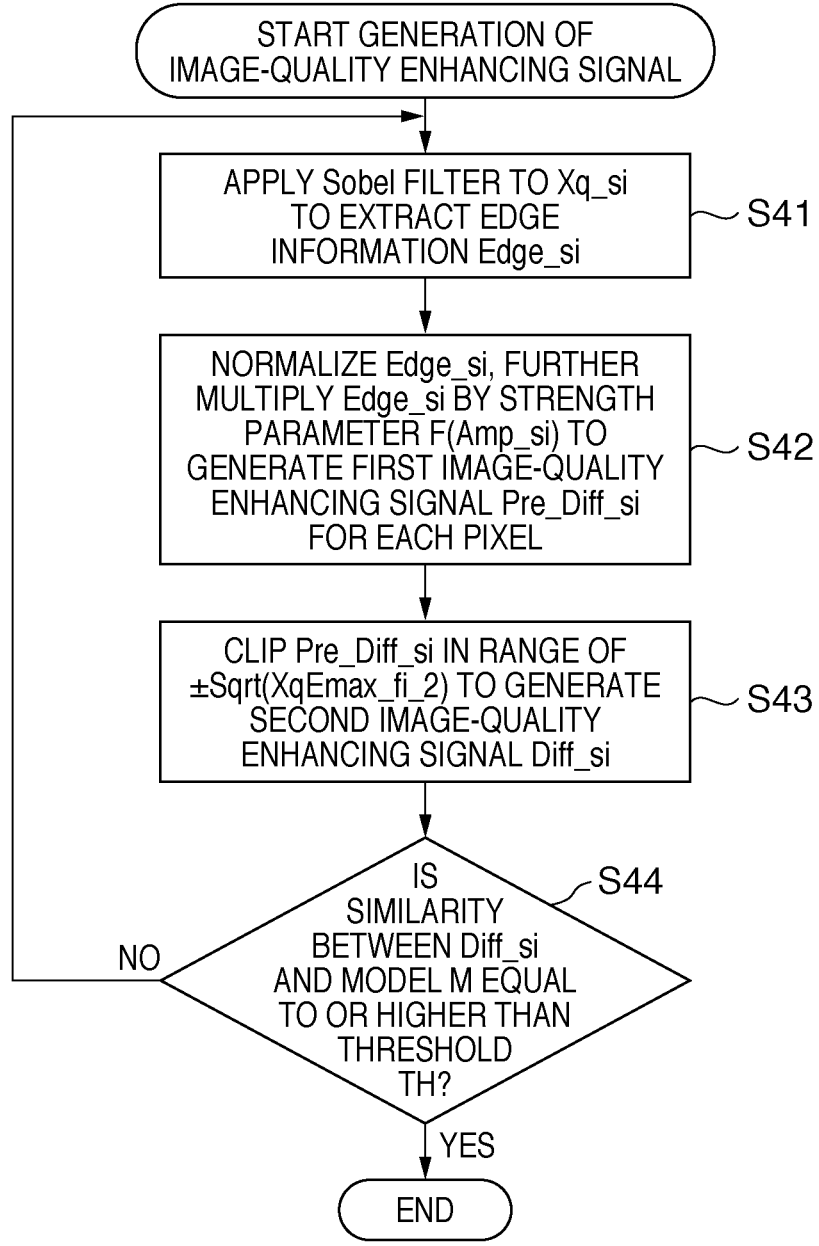
FIG. 10 is a flowchart describing processing by the optimum image-quality enhancing signal generator according to the third embodiment of the present invention.

FIG. 10 is a flowchart describing processing by the optimum image-quality enhancing signal generator 107b according to the third embodiment of the present invention.

When the generation of the optimum image-quality enhancing signal is started, first, in step S41, an edge of the decoded image signal Xq_si is detected with a Sobel filter, and edge information Edge_si is extracted. Next, in step S42, the edge information Edge_si is normalized, then multiplied by the strength parameter F(Amp_si), and thereby the first image-quality enhancing signal Pre_Diff_si for each pixel is generated. The strength parameter F(Amp_si) is a monotonically increasing function with Amp_si as a variable. Next, in step S43, the second image-quality enhancing signal generator 201 clips the value of each component of the first image-quality enhancing signal Pre_Diff_si with each element of $\pm\sqrt{(XqEmax\_si)}$, and thereby generates the image-quality enhancing signal Diff_si. Next, in step S44, the signal generation controller 900 compares each element of a prepared model M with the image-quality enhancing signal Diff_si. Then, if the similarity is lower than a threshold value TH, then the process returns to step S41. On the other hand, if the similarity is equal to or higher than the threshold value TH, then the image-quality enhancing signal Diff_si is supplied to the image synthesizer 108.

In the third embodiment, the strength parameter F(Amp_si) is a monotonically increasing function, however, it may be a multivariable function having statistical information of the decoded image signal Xq_si, information on the spectrum of interest Yq_fi or the like as a variable. Further, only the statistical information of the decoded image signal Xq_si may be used.

Further, each element of the quantization maximum square error XqEmax_fi_2 may be masked with a mask generated with statistical information of the spectrum of interest Yq_fi or the like.

Further, the quantization maximum square error XqEmax_fi_2 may be changed by referring to the statistical information of the decoded image signal. In this case, a route for the flow of statistical information or the like from the first inverse-orthogonal transformer 103 to the quantization error estimator 105 is prepared.

The outline of the third embodiment is as described above. Note that in the third embodiment, clipping is performed on information from the first image-quality enhancing signal generator 200a with information (the image-quality enhancing signal Diff_si) from the optimum image-quality enhancing signal generator 107b, however, it may be arranged such that scaling is performed on the information from the first image-quality enhancing signal generator 200a with the information (the image-quality enhancing signal Diff_si) from the optimum image-quality enhancing signal generator 107b. Further, the first and second inverse-orthogonal transformers 103 and 106 may be substituted with one inverse-orthogonal transformer.

Further, the signal generation controller 900 in the third embodiment may be provided in the above-described second embodiment.

Figure 11:
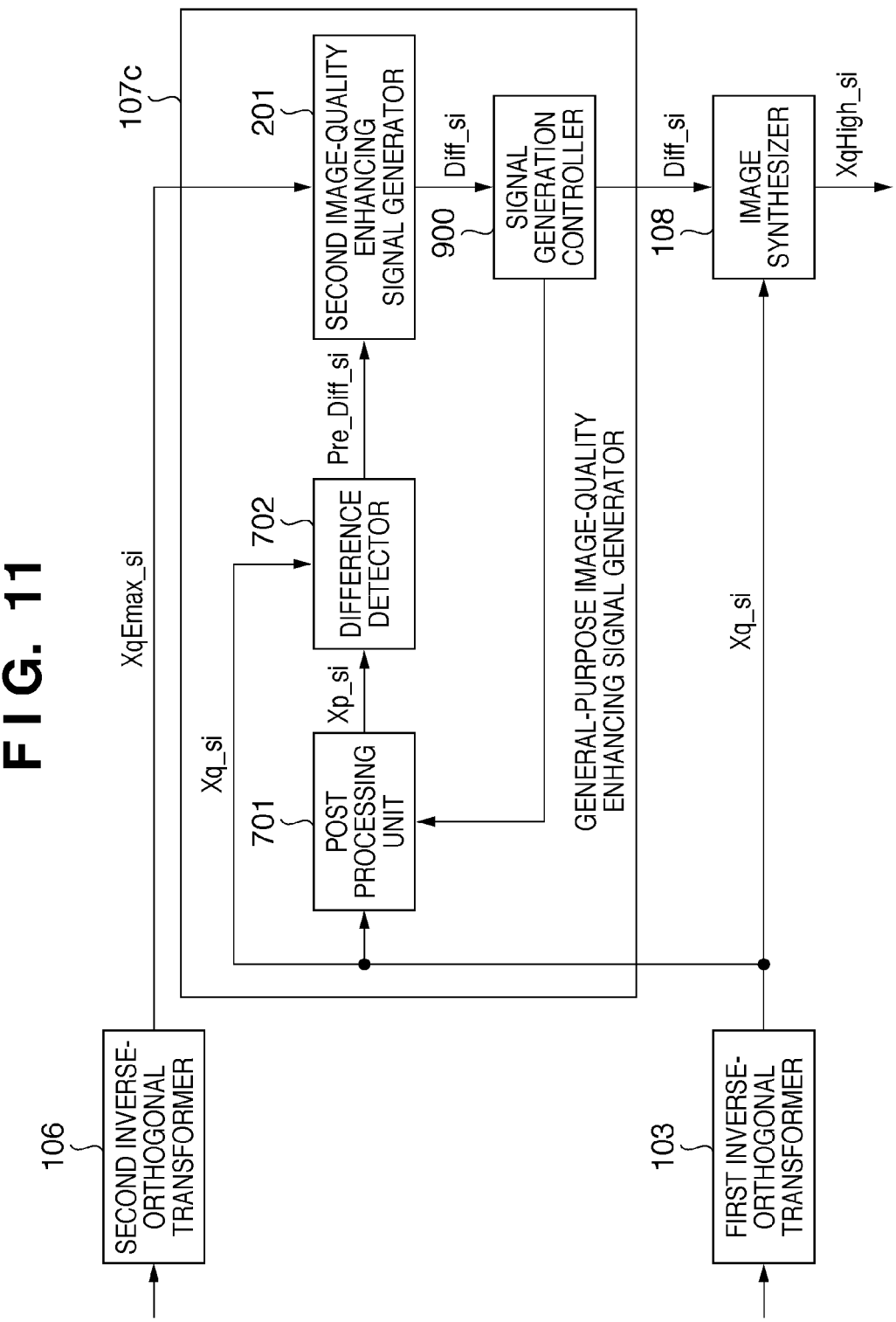
FIG. 11 is a block diagram describing a functional configuration of the general-purpose image-quality enhancing signal generator according to a modification (second embodiment+ third embodiment) of the third embodiment of the present invention.

FIG. 11 is a block diagram describing a functional configuration of a general-purpose image-quality enhancing signal generator 107c according to a modification (second embodiment+third embodiment) of the third embodiment of the present invention. In FIG. 11, the elements corresponding to those in FIGS. 7 and 9 have the same reference numerals, and explanations of the elements will be omitted.

A post processing unit 701 performs edge emphasis on a decoded image signal Xq_si generated by the first inverse-orthogonal transformer 103. A difference detector 702 detects a difference between the decoded image signal Xq_si generated by the first inverse-orthogonal transformer 103 and an edge-emphasized decoded image signal Xp_si from the post processing unit 701. The second image-quality enhancing signal generator 201 has the same function as that in the first embodiment. A signal generation controller 900 compares the signal (Diff_si) from the second image-quality enhancing signal generator 201 with a prepared model and determines the similarity. If the similarity is equal to or higher than a predetermined value, then the signal generation controller 900 transmits the signal to the image synthesizer 108. On the other hand, if it is determined that the similarity is lower than the predetermined value, then the signal generation controller 900 issues a re-processing command to generate the edge-emphasized decoded image signal Xp_si again to the post processing unit 701.

In the third embodiment, high-definition image-quality enhancing processing can be performed by pixel.

Further, as the upper limit of the strength of the image-quality enhancing processing is defined, image distortion due to image-quality enhancement can be avoided. Further, post processing closest to a prepared model can be performed.

Other Embodiment

The present invention can be applied to a system constituted by a plurality of devices or to an apparatus comprising a single device.

Further, the object of the present invention can also be achieved by directly or remotely providing a software program for performing the functions of the above-described embodiments to a system or an apparatus, reading the supplied program with a computer of the system or apparatus, then executing the program. In this case, as long as the system or apparatus has the functions of the program, the program may be executed in any form other than the form of a program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-153395, filed Jun. 11, 2008, which is hereby incorporated by reference herein in its entirety.

What is claimed is:

1. A decoding apparatus for decoding an encoded image signal, the apparatus comprising:
   a computer that executes a program that causes the apparatus to function as:
   an entropy decoding unit that performs an entropy decoding on an encoded image signal to generate quantized information;
   an inverse-quantization unit that performs an inverse quantization on the quantized information generated by the entropy decoding unit to obtain quantization information;
   a first inverse-orthogonal transforming unit that performs an inverse-orthogonal transformation on the quantization information obtained by the inverse-quantization unit to obtain a decoded image signal;
   a quantization error estimation unit that calculates a quantization maximum square error using a quantization matrix used in conjunction with the quantization information obtained by the inverse-quantization unit;
   a second inverse-orthogonal transforming unit that performs an inverse-orthogonal transformation on the quantization maximum square error calculated by the quantization error estimation unit to obtain a quantization maximum error;
   an image-quality enhancing signal generation unit that generates an image-quality enhancing signal to enhance an image quality of the decoded image using the decoded image signal obtained by the first inverse-orthogonal transforming unit and the quantization maximum error obtained by the second inverse-orthogonal transformation unit; and
   an image synthesizing unit that synthesizes the image-quality enhancing signal generated by the image-quality enhancing signal generation unit with the decoded image signal obtained by the first inverse-orthogonal transforming unit.

2. The decoding apparatus according to claim 1, wherein the image-quality enhancing signal generation unit functions as:
   a first image-quality enhancing signal generation unit that performs image-quality enhancing processing of adding a signed signal to the decoded image signal obtained by the first inverse-orthogonal transforming unit; and
   a second image-quality enhancing signal generation unit that outputs a signal obtained by performing threshold-based processing on a signal from the first image-quality enhancing signal generation unit using the quantization maximum error obtained by the second inverse-orthogonal transforming unit.

3. The decoding apparatus according to claim 1, wherein the image-quality enhancing signal generation unit including:
   a post processing unit that performs image-quality enhancing processing of adding a signed signal to the decoded image signal outputted from the first inverse-orthogonal transformer;
   a difference detection unit that detects a difference between the decoded image signal and a first image-quality enhancing signal edge-emphasized by the post processing unit; and
   a second image-quality enhancing signal generation unit that outputs a signal obtained by performing threshold-based processing on a signal from the difference detection unit using information from the second inverse-orthogonal transformer and the difference detected by the difference detection unit.

4. The decoding apparatus according to claim 1, wherein the image-quality enhancing signal generation unit including:
   a first image-quality enhancing signal generation unit that performs image-quality enhancing processing of adding a signed signal to the decoded image signal outputted from the first inverse-orthogonal transformer;
   a second image-quality enhancing signal generation unit that outputs a signal obtained by performing threshold-based processing on a signal from the first image-quality enhancing signal generation unit using information from the second inverse-orthogonal transformer; and
   a signal generation control unit that compares the signal from the second image-quality enhancing signal generation unit with a prepared model to determine similarity between the signal and the model, and if the similarity is equal to or higher than a predetermined value, outputting the signal from the second image-quality enhancing signal generation unit, while if the similarity is lower than the predetermined value, instructing the first image-quality enhancing signal generation unit to perform re-processing.

5. The decoding apparatus according to claim 1, wherein the image-quality enhancing signal generation unit including:

a post processing unit that performs image-quality enhancing processing of adding a signed signal to the decoded image signal outputted from the first inverse-orthogonal transformer;

a difference detection unit that detects a difference between the decoded image signal and a first image-quality enhancing signal outputted from the post processing unit;

a second image-quality enhancing signal generation unit that outputs a signal obtained by performing threshold-based processing on a signal from the difference detection unit using the information from the second-inverse orthogonal transformer and the difference detected by the difference detection unit; and a signal generation control unit that compares a signal from the second image-quality enhancing signal generation unit with a prepared model to determine similarity between the signal and the model, and if the similarity is equal to or higher than a predetermined value, outputting the signal from the second image-quality enhancing signal generation unit, while if the similarity is lower than the predetermined value, instructing the post processing unit to perform re-processing.

6. The decoding apparatus according to claim 2, wherein the image-quality enhancing processing includes any one, or a combination of at least two, of an edge emphasis process, an encoding noise reduction process, a motion compensation process, an IP conversion process, a frame rate conversion process, and a color conversion process.

7. The decoding apparatus according to claim 6, wherein the second image-quality enhancing signal generation unit performs re-scaling of the decoded image signal obtained by the first inverse-orthogonal transforming unit limited to the quantization maximum error obtained by the second inverse-orthogonal transforming unit.

8. The decoding apparatus according to claim 1, wherein the quantization error estimation unit functions as:

a spectral selection unit that selects a spectrum for which the quantization maximum square error on frequency space is estimated from the quantization information obtained by the inverse-quantization unit; and an error estimation unit that estimates the quantization maximum square error on the frequency space from the quantization information for the spectrum selected by the spectral selection unit.

9. The decoding apparatus according to claim 1, wherein the second inverse-orthogonal transforming unit performs an inverse-orthogonal transformation of a quantization matrix as a square of a quantization matrix used in the first inverse-orthogonal transforming unit.

10. The decoding apparatus according to claim 1, wherein the image synthesizing unit performs synthesis by adding the image-quality enhancing signal to the decoded image signal obtained by the first inverse-orthogonal transforming unit.

11. A control method for a decoding apparatus for decoding an encoded image, the method comprising:

an entropy decoding step of performing an entropy-decoding on an encoded image signal and generating quantized information;

an inverse-quantization step of performing an inverse-quantizing process on the quantized information generated in the entropy decoding step and obtaining quantization information;

a first inverse-orthogonal transformation step of performing an inverse-orthogonal transformation on the quantization information obtained in the inverse-quantization step to obtain a decoded image signal;

a quantization error estimation step of calculating a quantization maximum square error using a quantization matrix used in conjunction with the quantization information obtained in the inverse-quantization step;

a second inverse-orthogonal transformation step of performing an inverse-orthogonal transformation on the quantization maximum square error calculated in the quantization error estimation step and obtaining a quantization maximum error;

an image-quality enhancing signal generation step of generating an image-quality enhancing signal to enhance an image quality of the decoded image using the decoded image signal obtained in the first inverse-orthogonal transformation step and the quantization maximum error obtained in the second inverse-orthogonal transformation step; and an image synthesizing step of synthesizing the image-quality enhancing signal generated in the image-quality enhancing signal generation step with the decoded image signal obtained in the first inverse-orthogonal transforming step.

12. The control method according to claim 11, wherein the image-quality enhancing signal generation step includes:

a first image-quality enhancing signal generation step of performing image-quality enhancing processing of adding a signed signal to the decoded image signal obtained in the first inverse-orthogonal transformation step; and a second image-quality enhancing signal generation step of outputting a signal obtained by performing threshold-based processing on a signal obtained in the first image-quality enhancing signal generation step using the quantization maximum error obtained in the second inverse-orthogonal transformation step.

13. The control method according to claim 11, wherein the image-quality enhancing signal generation step including:

a post processing step of performing image-quality enhancing processing of adding a signed signal to the decoded image signal outputted in the first inverse-orthogonal transformation step;

a difference detection step of detecting a difference between the decoded image signal and a first image-quality enhancing signal edge-emphasized in the post processing step; and a second image-quality enhancing signal generation means for outputting a signal obtained by performing threshold-based processing on a signal obtained in the difference detection step using information obtained in the second inverse-orthogonal transformation step and the difference detected in the difference detection step.

14. The control method according to claim 11, wherein the image-quality enhancing signal generation step including:

a first image-quality enhancing signal generation step of performing image-quality enhancing processing of adding a signed signal to the decoded image signal outputted in the first inverse-orthogonal transformation step;

a second image-quality enhancing signal generation step of outputting a signal obtained by performing threshold-based processing on a signal generated in the first image-quality enhancing signal generation step using information obtained in the second inverse-orthogonal transformation step; and a signal generation control step of comparing a signal obtained in the second image-quality enhancing signal generation step with a prepared model to determine similarity between the signal and the model, and if the similarity is equal to or higher than a predetermined value, outputting the signal outputted in the second image-quality enhancing signal generation step, while if the similarity is lower than the predetermined value, instructing the first image-quality enhancing signal generation step to perform re-processing.

* * * * *